(12) United States Patent
Lee

(10) Patent No.: US 12,508,985 B2
(45) Date of Patent: Dec. 30, 2025

(54) ENGINE SOUND GENERATING SYSTEM BASED ON STRING SOUND SOURCE, AND ENGINE SOUND GENERATING METHOD

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 308 days.

(21) Appl. No.: 18/498,791

(22) Filed: Oct. 31, 2023

(65) Prior Publication Data
US 2024/0198902 A1 Jun. 20, 2024

(30) Foreign Application Priority Data
Dec. 20, 2022 (KR) .................. 10-2022-0178995

(51) Int. Cl.
*B60Q 5/00* (2006.01)
*G10K 15/02* (2006.01)
*G10K 15/04* (2006.01)

(52) U.S. Cl.
CPC ............. *B60Q 5/008* (2013.01); *G10K 15/02* (2013.01)

(58) Field of Classification Search
CPC ........ B60Q 5/008; G10K 15/02; G10K 15/04; B60Y 2306/11
USPC ............................ 381/86, 302, 365, 389, 300
See application file for complete search history.

(56) References Cited

U.S. PATENT DOCUMENTS

| | | | | | |
|---|---|---|---|---|---|
| 4,393,271 | A | * | 7/1983 | Fujinami | B60R 16/0373 704/235 |
| 4,538,295 | A | * | 8/1985 | Noso | G10L 25/87 704/E11.005 |
| 9,129,602 | B1 | * | 9/2015 | Shepard | G10L 21/013 |
| 2007/0288238 | A1 | * | 12/2007 | Hetherington | G10L 25/87 704/E15.005 |

FOREIGN PATENT DOCUMENTS

KR 101876022 B1 8/2018

\* cited by examiner

*Primary Examiner* — Thjuan K Addy
(74) *Attorney, Agent, or Firm* — NovoTechIP International PLLC

(57) ABSTRACT

An engine sound generating system, positioned in a moving object, includes a repeating section selection unit for recognizing at least one vowel section from an input sound source, and selecting a repeating section to be repeated based on the vowel section; a repetitive waveform generating unit for generating a repetitive waveform based on the selected repeating section; and an engine sound output unit for generating and outputting an engine sound by interpolating the generated repetitive waveform.

19 Claims, 8 Drawing Sheets

ENGINE SOUND GENERATING SYSTEM BASED ON STRING SOUND SOURCE, AND ENGINE SOUND GENERATING METHOD

CROSS-REFERENCE TO RELATED APPLICATIONS

This application claims priority under 35 U.S.C. § 119 to Korean Patent Application No. 10-2022-0178995, filed on Dec. 20, 2022, in the Korean Intellectual Property Office, the disclosure of which is incorporated herein by reference in its entirety.

TECHNICAL FIELD

The following disclosure relates to an engine sound generating system and an engine sound generating method, and more particularly, to an engine sound generating system and an engine sound generating method, based on a string sound source, in which an engine sound is output by generating a repetitive waveform based on a recognized vowel section when generating an engine sound.

BACKGROUND

An electric vehicle does not have engine sound, and it is thus difficult for a driver to audibly recognize a speed of the vehicle while driving. Accordingly, an active sound design (ASD) system of the electric vehicle is designed to generate a sound that gives a sense of immersion to the driver based on the driving speed, torque of a motor, and state of an accelerator pedal of the vehicle.

A method generally used in the ASD system is a wavetable method. This method is similar to a simple digital sine wave generation method, and may generate a consecutive sound by repeating more general waveforms, and generate a quasi-periodic function like a musical score by overlapping various wavetables with each other as shown in FIG. 1. When using this wavetable method, an amount of data may be reduced compared to a case of PCM sampling a sound source, and real-time calculation is possible because this wavetable method does not include a conversion process such as Inverse Discrete Fourier Transform.

However, when using the wavetable method, a quasi-periodic function having a short length may be generated and repeated, and a waveform as shown in FIG. 2 may be output. Accordingly, transmission of meaning may redundantly occur, which may cause the driver to have a lower sense of immersion in his/her driving.

SUMMARY

An embodiment of the present disclosure is directed to providing an engine sound generating system and an engine sound generating method, based on a string sound source, in which a string engine sound may be generated based on a vowel section of an input sound source to change a pitch during acceleration while maintaining a shape of an input waveform.

In one general aspect, provided is an engine sound generating system based on a string sound source, positioned in a moving object, the system including: a repeating section selection unit recognizing at least one vowel section from an input sound source, and selecting a repeating section which is a section to be repeated based on the vowel section; a repetitive waveform generating unit generating a repetitive waveform based on the selected repeating section; and an engine sound output unit generating and outputting an engine sound by interpolating the generated repetitive waveform.

The repeating section selection unit may include a string recognition unit recognizing a string from the input sound source, and the string recognition unit may calculate a probability that a waveform of the input sound source at a predetermined time point is to be classified into a predetermined letter.

The string recognition unit may extract a feature from the input sound source, encode the extracted feature, and classify the encoded feature into a letter and a word boundary.

The string recognition unit may match a letter for each extracted feature and recognize the string by merging the same consecutive letters with each other among the letters.

The repeating section selection unit may output a boundary of each letter in the waveform based on the recognized string.

The repeating section selection unit may recognize the vowel section by calculating a path having a maximum value among probabilities that the waveform at a specific time point maintains a current character or advances to a next character and matching the string and the waveform with each other.

The repeating section selection unit may classify the recognized vowel section for each period to calculate average signal power and a frequency response and select a section in which changes in the calculated average signal power and frequency response are minimized as the repeating section.

The repetitive waveform generating unit may generate the repetitive waveform by interpolating a sample waveform having a period in units of real numbers.

The engine sound output unit may generate the engine sound when at least one of output of an accelerator position sensor (APS) positioned in the moving object or revolutions per minute (RPM) of the moving object is rapidly increased and generate the engine sound by interpolating the repetitive waveform while increasing a pitch scale factor of the repetitive waveform as at least one of the output of the APS or RPM of the moving object is rapidly increased.

The engine sound output unit may modulate a last part of a predetermined length of the input sound source based on the increased pitch of the engine sound, and then output the engine sound when determining that an acceleration is saturated based on either the output of the APS or RPM of the moving object.

In another general aspect, provided is an engine sound generating method based on a string sound source of an engine sound generating system which is positioned in a moving object, and includes a repeating section selection unit, a repetitive waveform generating unit, and an engine sound output unit, the method including: (a) recognizing, by the repeating section selection unit, a vowel section from an input sound source, and selecting a repeating section which is a section to be repeated based on the recognized vowel section; (b) generating, by the repetitive waveform generating unit, a repetitive waveform based on the selected repeating section; and (c) generating and outputting, by the engine sound output unit, an engine sound by interpolating the repetitive waveform.

The operation (a) may include: (a-1) recognizing a string from the input sound source; and (a-2) outputting a boundary of each letter in the waveform based on the recognized string, wherein in the operation (a-1), a probability may be calculated that a waveform of the input sound source at a predetermined time point is to be classified into a predetermined letter.

In the operation (a-1), a feature may be extracted from the input sound source, the extracted feature may be encoded, and the encoded feature may be classified into the letter and a word boundary.

In the operation (a-1), the letter may be matched for each extracted feature, and the string may be recognized by merging the same consecutive letters with each other among the letters.

In the operation (a-2), the vowel section may be recognized by calculating a path having a maximum value among probabilities that the waveform at a specific time point maintains a current character or advances to a next character and matching the string and the waveform with each other.

The operation (a) may further include (a-3) classifying the recognized vowel section for each period to calculate average signal power and a frequency response, and selecting a section in which changes in the calculated average signal power and frequency response are minimized as the repeating section after the operation (a-2).

In the operation (b), the repetitive waveform may be generated by interpolating a sample waveform having a period in units of real numbers.

In the operation (c), the engine sound may be generated when at least one of output of an accelerator position sensor (APS) positioned in the moving object or revolutions per minute (RPM) of the moving object is rapidly increased, and the engine sound may be generated by interpolating the repetitive waveform while increasing a pitch scale factor of the repetitive waveform as at least one of the output of the APS or RPM of the moving object is rapidly increased.

In the operation (c), a last part of a predetermined length of the input sound source may be modulated based on the increased pitch of the engine sound, and the engine sound may then be output when it is determined that an acceleration is saturated based on either the output of the APS or RPM of the moving object.

DETAILED DESCRIPTION

In order to describe the present disclosure, operational advantages of the present disclosure and objects accomplished by embodiments of the present disclosure, the embodiments of the present disclosure are hereinafter exemplified and described with reference to the accompanying drawings.

First, terms used in the specification are used only to describe the specific embodiments rather than limiting the present disclosure, and a term of a singular number may include its plural number unless explicitly indicated otherwise in the context. In addition, it is to be understood that a term "include," "formed of," or the like used in this application specifies the existence of features, numerals, steps, operations, components, parts, or combinations thereof, which are mentioned in the specification, and does not preclude the existence or addition of one or more other features, numerals, steps, operations, components, parts, or combinations thereof.

When it is decided that the detailed description of the known configuration or function related to the present disclosure may obscure the gist of the present disclosure, the detailed description thereof will be omitted.

Prior to the description of the present disclosure, an engine sound enhancement (ESE) system may enhance a driver's auditory satisfaction by outputting an engine sound from a speaker to enhance the engine sound of a moving object. Recently, the engine sound has been introduced to an electric vehicle to increase driving immersion and mask a high-frequency component of a motor driving sound. The electric vehicle uses a quiet electric motor, and may thus also use a synthesized sound outside a range of a traditional engine sound as the engine sound. As a sound source is used for the engine sound synthesis, the range of the engine sound may extend to a string sound including a word rather than a waveform. The string may deliver a direct meaning to the driver and may thus add fun of driving and maximize a sense of immersion in acceleration when output while increasing a pitch of the sound during the acceleration process. However, when an acceleration period is longer than a length of the sound source, a wavetable synthesizer may repeatedly output the sound source, thus redundantly delivering the meaning, which may cause discomfort to the driver. In addition, a timbre may be changed or a parasitic period component may be added during a process of compensating for a rapid phase change occurring at a boundary of the sound source. Therefore, the present disclosure proposes an engine sound generating system and an engine sound generating method, based on a string sound source, in which a pitch may be changed during the acceleration while maintaining a shape of the sound source waveform.

Figure 1:
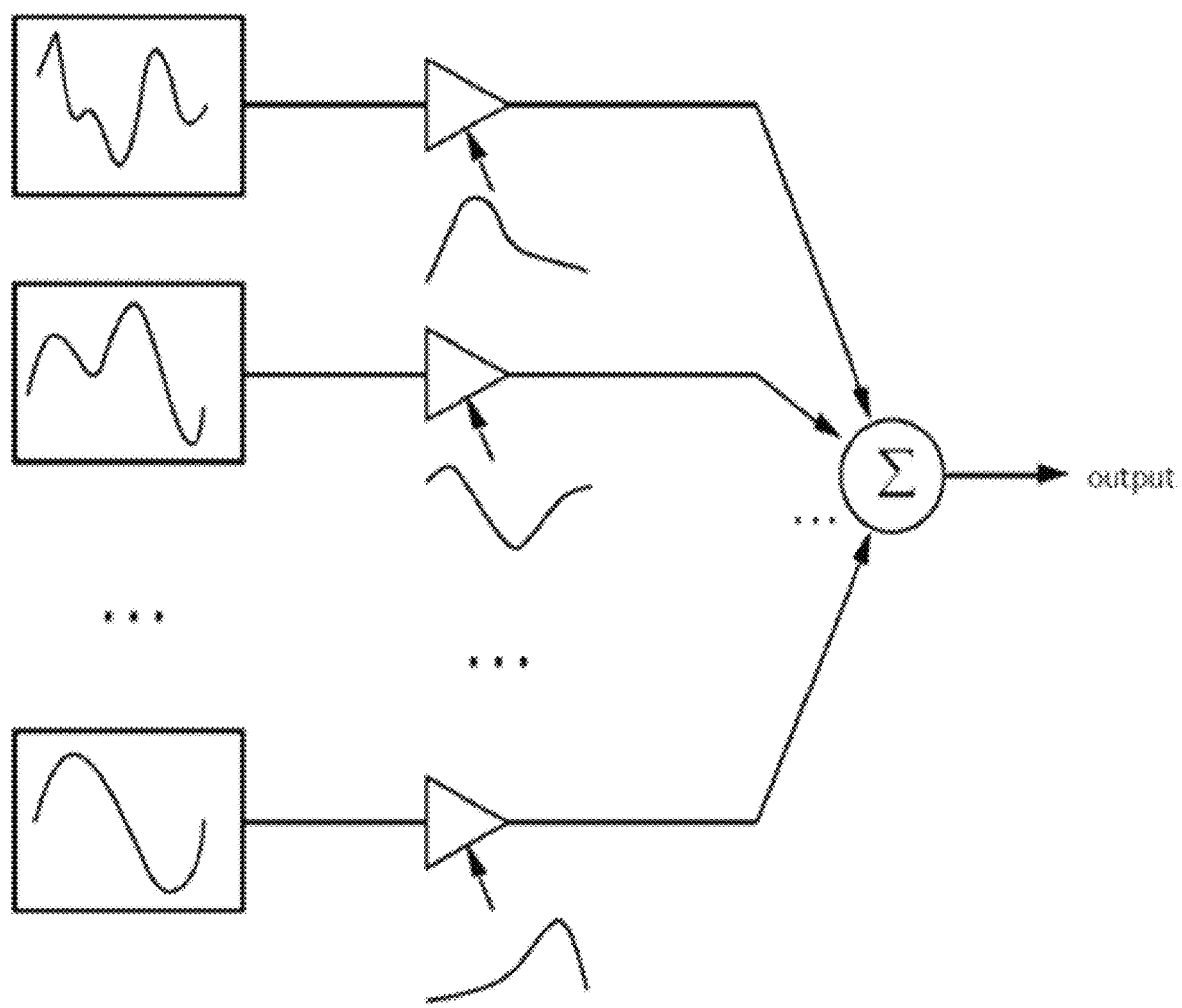
FIG. 1 shows a conventional wavetable overlap method.
Figure 2:
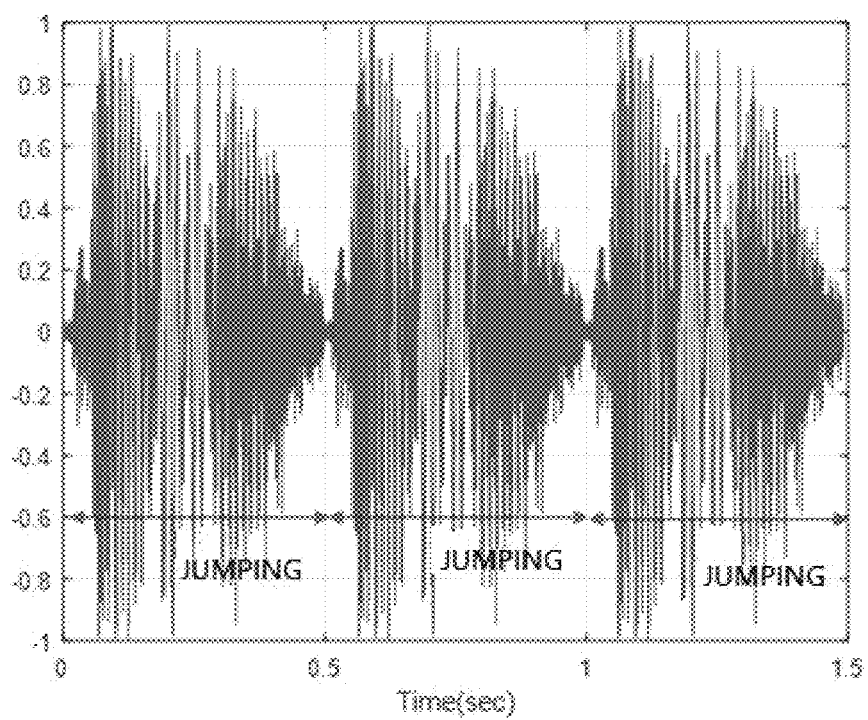
FIG. 2 is a graph showing a conventional wavetable-based string output waveform.
Figure 3:
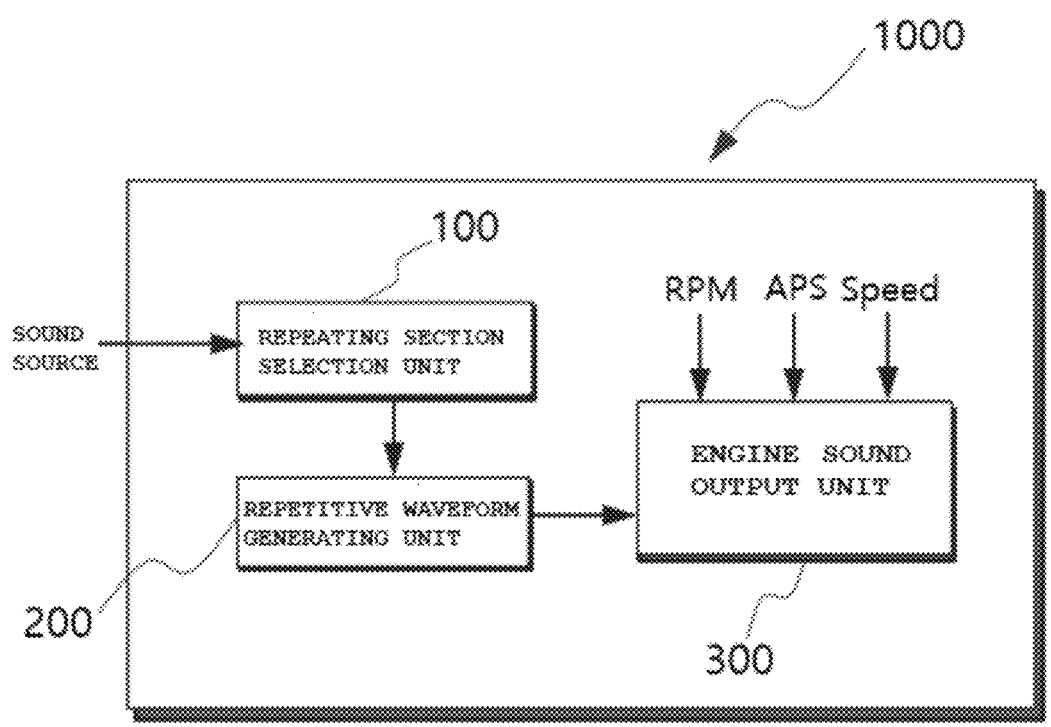
FIG. 3 is a block diagram showing an engine sound generating system according to the present disclosure.

FIG. 3 is a block diagram showing an engine sound generating system according to the present disclosure.

As shown in FIG. 3, an engine sound generating system 1000 according to an embodiment of the present disclosure may include a repeating section selection unit 100, a repetitive waveform generating unit 200, and an engine sound output unit 300.

The repeating section selection unit 100 may recognize at least one vowel section from an input sound source and select a repeating section which is a section to be repeated based on the recognized vowel section.

The repetitive waveform generating unit 200 may generate a repetitive waveform based on the selected repeating section.

An engine sound output unit 300 may generate an engine sound by interpolating the generated repetitive waveform and output a final engine sound based on the generated engine sound.

Meanwhile, a vowel may have a relatively long and stable flat part of a waveform and have a quasi-periodic component. In addition, when naturally increasing a speech sound, a person may pronounce the vowel longer than a consonant, and may thus deliver a sound meaning by using the vowel section.

Accordingly, the repeating section selection unit 100 may include a string recognition unit (not shown).

The string recognition unit may recognize a string from the input sound source and calculate a probability that a waveform at a predetermined time point is to be classified into a predetermined letter. In detail, the string recognition unit may extract a feature from the waveform of the input sound source, encode the extracted feature, and classify the encoded feature into the letter and a word boundary. Here, the string recognition unit may match the letter for each extracted feature, thus merging the same consecutive letters with each other.

In addition, the repeating section selection unit 100 may output a boundary of each letter in the waveform based on the recognized string. In detail, in order to match the string and the waveform with each other, the repeating section selection unit 100 may cause the waveform at a specific time point to maintain a current character or advance to a next character. In more detail, the string recognition unit may output the probability that the waveform at the specific time point is to be classified as the letter. Therefore, the repeating section selection unit 100 may map the string and the waveform by acquiring a path having a maximum value among probabilities that the waveform maintains the current character or advances to the next character. Accordingly, the string recognition unit may recognize the vowel section (A, E, I, O, or U).

Meanwhile, the vowel section may include a quasi-periodic function, and the repeating section selection unit 100 may thus classify the recognized vowel section for each period to calculate average signal power and a frequency response. In addition, the repeating section selection unit 100 may select a section in which changes in the calculated average signal power and frequency response are minimized as the repeating section. The repeating section selection unit 100 selects the section in which the changes in the average signal power and frequency response are minimized, thus minimizing a parasitic frequency component. In more detail, the repeating section selection unit 100 may use an auto correlation function.

The repetitive waveform generating unit 200 may then generate the repetitive waveform by interpolating a sample waveform having a period in units of real numbers in generating the repetitive waveform based on the repeating section selected by the repeating section selection unit 100.

Figure 4:
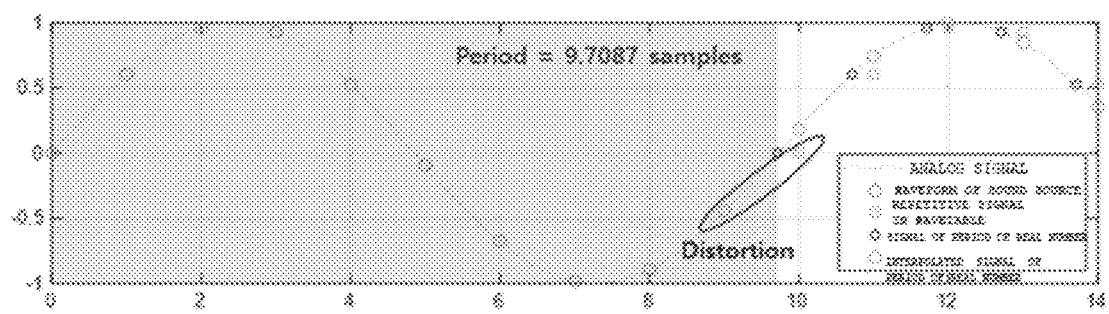
FIG. 4 is a graph showing distortion occurring when repeating a waveform.

FIG. 4 is a graph showing distortion occurring when repeating a waveform.

In detail, as shown in FIG. 4, a phase difference may occur at the boundary if a period of the selected section is not an integer multiple of a sample period when the repeating section is selected in a vowel section having a quasi-periodic function feature of a sample string. In addition, periodicity may be broken if a time axis is contracted to change a pitch even when there is no phase difference. Therefore, it is necessary to generate the repetitive waveform without the phase difference by interpolating the sample waveform having the period in units of real numbers.

First, when generating a consecutive sample waveform w by using a waveform x having N($\leq N_p$) samples with a period of $N_p(\in R)$, a position of an n-th sample is as shown in Equation 1 below:

$$k_n \begin{cases} 0, & \text{if } n = 0 \\ k_{n-1} + r_n, & \text{if } n > 0 \end{cases} \quad \text{[Equation 1]}$$

Here, $k(\in R)$ indicates a position of the waveform in a digital domain, and $r(\in R)$ indicates a pitch scale factor. That is, when a value of r is increased over time, the pitch of a given waveform may be increased over time. The waveform may be repeated with a period of $N_p$, and the n-th sample of the repetitive waveform is as shown in Equation 2 below:

$$w[n] = x[k_n - \lfloor k_n/N_p \rfloor N_p] \quad \text{[Equation 2]}$$

Meanwhile, when a period of an analog signal is not an integer multiple of a sample period, a signal of exactly one period cannot be stored in a process of sampling and storing the same in a wavetable. The wavetable synthesizer may generate consecutive sounds by repeatedly reproducing the stored wavetable. Therefore, a clicking sound or a warbling sound may occur due to the distortion when the sample stored at a next sample output time point is output again from the beginning.

Therefore, a period of the real number may be used in the present disclosure, and no distortion may occur when repeating the waveform. In addition, the repetitive waveform generated using the period of the real number may change the sample period in the middle. Therefore, an output signal having the same sample frequency may be generated using an interpolation method.

In addition, an engine sound enhancement (ESE) system may synthesize and use a sine wave having multiple orders to enhance the engine sound. When $o_{max}$ indicates a minimum order to be used and $o_{max}$ indicates a maximum order, a bandwidth of the engine sound may be proportional to revolutions per minute (RPM) as shown in Equation 3 below:

$$\text{bandwidth} = RPM \frac{(o_{max} - o_{min})}{60} \quad \text{[Equation 3]}$$

Therefore, the engine sound output unit 300 may generate a down-sampled signal by down-sampling the generated repetitive waveform at a predetermined interval r as shown in Equation 4 below. When maintaining a sample frequency $f_s$, the down-sampled signal x[m] is as shown in Equation 4 below:

$$x[m] = x[rn] = \frac{1}{N}\left(x[k_{min}]e^{j2\pi\frac{k_{min}\mathcal{T}}{N}n} + \ldots + x[k_{min}]e^{j2\pi\frac{k_{min}\mathcal{T}}{N}n}\right) \quad \text{[Equation 4]}$$

Here, m and n indicate sample indices, r indicates a pitch scale factor, and N indicates a length of the signal.

Therefore, the bandwidth is $x(k_{max} - k_{min})f_s$, and the engine sound may be generated by interpolating the repetitive waveform by changing r based on the RPM.

In detail, the engine sound generated by the engine sound generating system 1000 according to the present disclosure may be used as a sound effect to add pleasure to driving the vehicle in a rapid acceleration situation or the like. Therefore, as shown in FIG. 3, the engine sound output unit may generate the engine sound when at least one of output of an accelerator position sensor (APS) positioned in the moving object or the RPM of the moving object is rapidly increased.

In more detail, the engine sound output unit may generate the engine sound as described above by interpolating the repetitive waveform while increasing the pitch scale factor r of the repetitive waveform as at least one of the output of the accelerator position sensor (APS) or the RPM of the moving object is rapidly increased.

In addition, the engine sound output unit 300 may modulate the last part of a predetermined length of the input sound source based on the increased pitch of the engine sound, and then output the final engine sound when determining that the acceleration is saturated based on either the output of the APS or RPM of the moving object.

In conclusion, according to the present disclosure, the vowel section of the string sound source (waveform) may be increased, and accordingly, an entire sound source may not be repeated as in a general wavetable synthesizer. In addition, the sample frequency output by the sound source may be fixed, and the pitch may thus be increased when the waveform is re-sampled while increasing a digital period of the selected waveform. When the acceleration is saturated, the output of the string engine sound may be finished by stopping the repetition and then outputting the rest waveform based on the increased pitch.

Finally, the description describes the engine sound generating method of the present disclosure.

Figure 5:
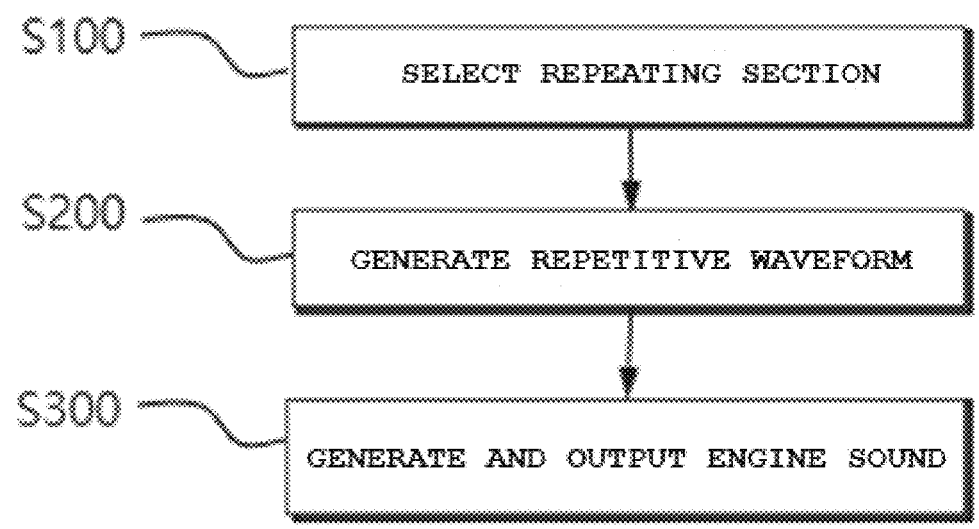
FIG. 5 is a flowchart showing an engine sound generating method according to the present disclosure.

FIG. 5 is a flowchart showing the engine sound generating method according to the present disclosure.

The engine sound generating method of an engine sound generating system 1000 which is positioned in a moving object and includes a repeating section selection unit 100, a repetitive waveform generating unit 200, and an engine sound output unit 300, may include: (a) recognizing, by the repeating section selection unit 100, a vowel section from an input sound source, and selecting a repeating section which is a section to be repeated based on the recognized vowel section (S100); (b) generating, by the repetitive waveform generating unit 200, a repetitive waveform based on the repeating section (S200); and (c) generating, by the engine sound output unit, an engine sound by interpolating the repetitive waveform, and outputting a final engine sound based on the generated engine sound (S300).

In detail, the operation (a) may include: (a-1) recognizing a string from the input sound source (not shown); and (a-2) outputting a boundary of each letter in the waveform based on the recognized string (not shown), wherein in the operation (a-1), a probability may be calculated that a waveform at a predetermined time point is to be classified into a predetermined letter.

In detail, in the operation (a-1), a feature may be extracted from the input sound source, the extracted feature may be encoded, and the encoded feature may be classified into the letter and a word boundary. Here, the letter may be matched for each extracted feature, and the same consecutive letters may be merged with each other.

In addition, in the operation (a-2), a boundary of each letter may be acquired in the waveform based on the recognized string. In detail, in the operation (a-2), in order to match the string and the waveform with each other, a waveform at a specific time point may maintain a current character or advance to a next character. In more detail, the probability that the waveform at the specific time point is to be classified as the letter may be output. Therefore, the string and the waveform may be mapped by acquiring a path having a maximum value among probabilities that the waveform maintains the current character or advances to the next character. Accordingly, the vowel section (A, E, I, O, or U) may be recognized.

The operation (a) may further include (a-3) classifying the recognized vowel section for each period to calculate average signal power and a frequency response, and selecting a section in which changes in the calculated average signal power and frequency response are minimized as the repeating section (not shown) after the operation (a-2).

In addition, in the operation (b), the repetitive waveform may be generated by interpolating a sample waveform having a period in units of real numbers. It is thus possible to solve a problem in which a phase difference occurs at the boundary if a period of the selected section is not an integer multiple of a sample period when the repeating section is selected in a vowel section having a quasi-periodic function feature of a sample string. It is also possible to solve a problem in which periodicity may be broken if a time axis is contracted to change a pitch even when there is no phase difference.

In addition, in the operation (c), the engine sound may be generated when at least one of output of an accelerator position sensor (APS) positioned in the moving object or revolutions per minute (RPM) of the moving object is rapidly increased, and the engine sound may be generated by interpolating the repetitive waveform while increasing a pitch scale factor of the repetitive waveform as at least one of the output of the APS or RPM of the moving object is rapidly increased.

In more detail, in the operation (c), the last part of a predetermined length of the input sound source may be modulated based on the increased pitch of the engine sound, and the engine sound may then be output when it is determined that the acceleration is saturated based on either the output of the APS or RPM of the moving object.

Figure 6:
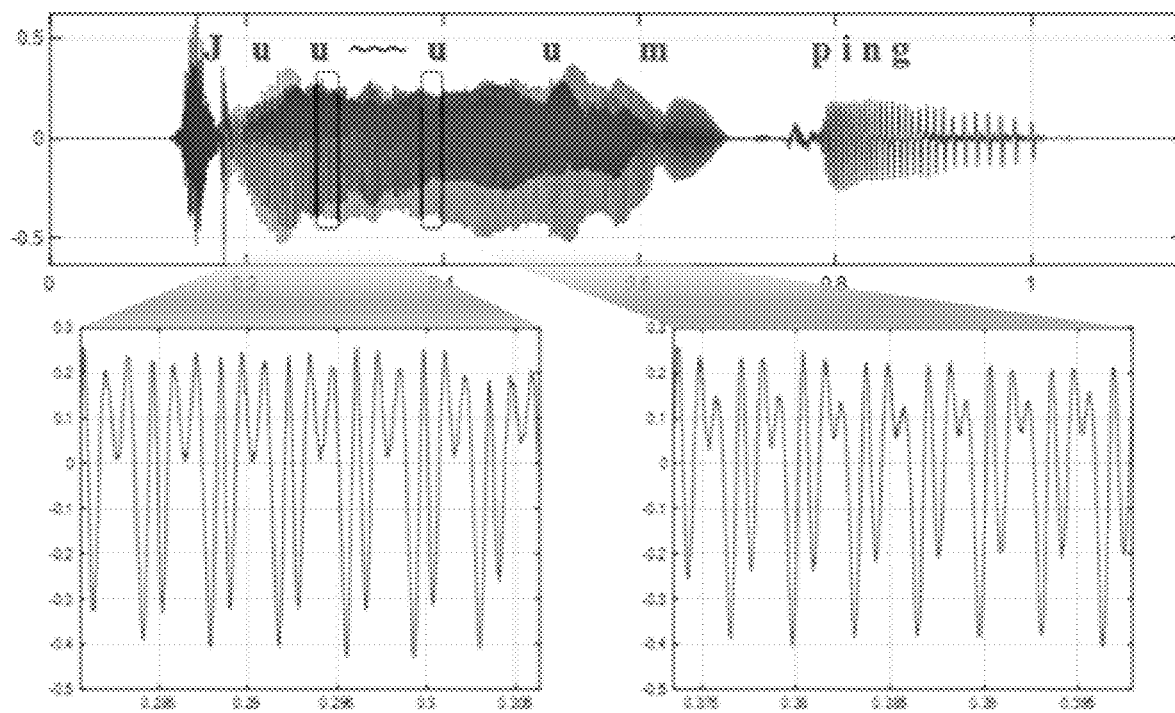
FIG. 6 is a graph showing a waveform change in a flattening section according to the present disclosure.

FIG. 6 is a graph showing a waveform change in a flattening section according to the present disclosure.

Figure 7:
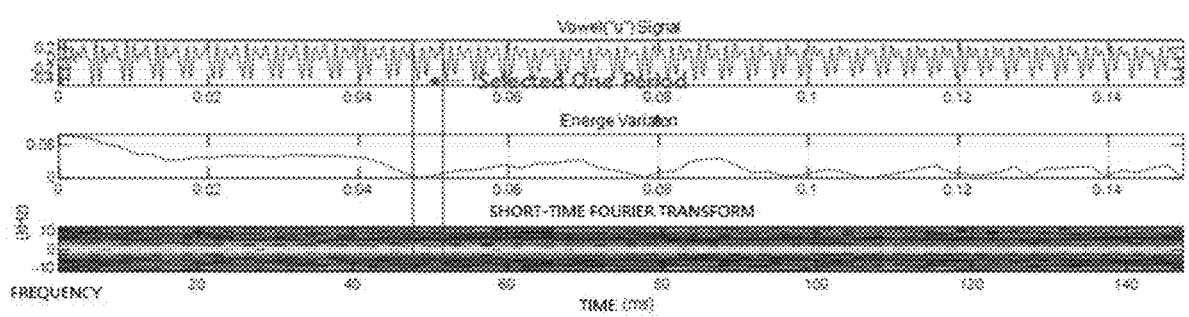
FIG. 7 is a graph showing an example of selecting a repeating section of one period according to the present disclosure.

FIG. 7 is a graph showing an example of selecting a repeating section of one period according to the present disclosure.

Figure 8A:
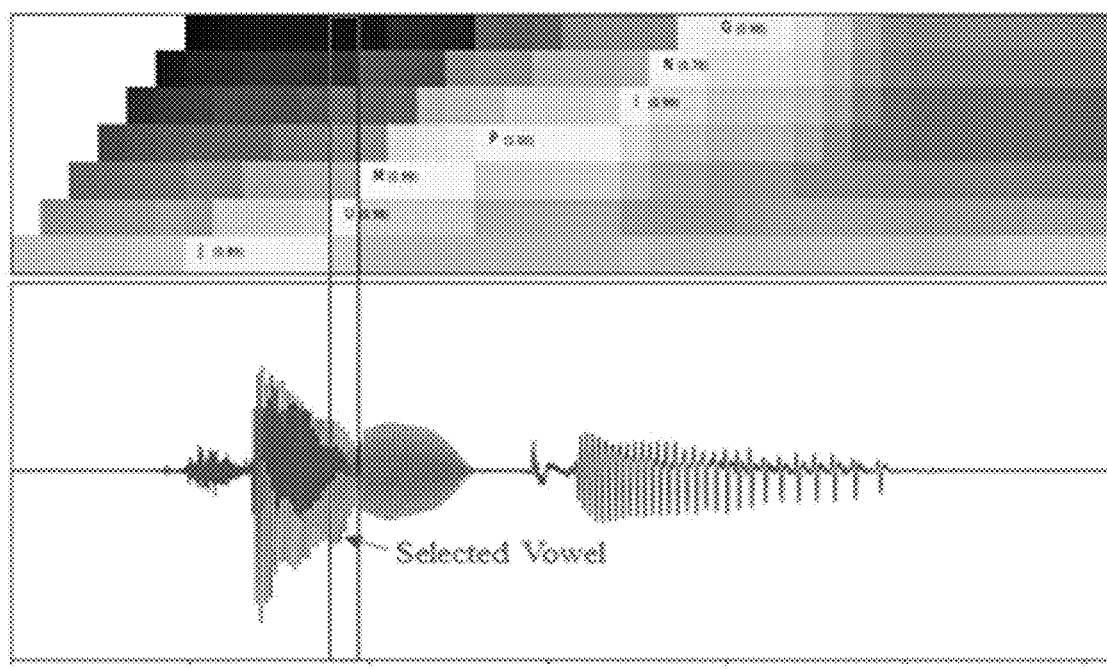
FIGS. 8A and 8B are graphs showing a string engine sound generated by the present disclosure.
Figure 8B:
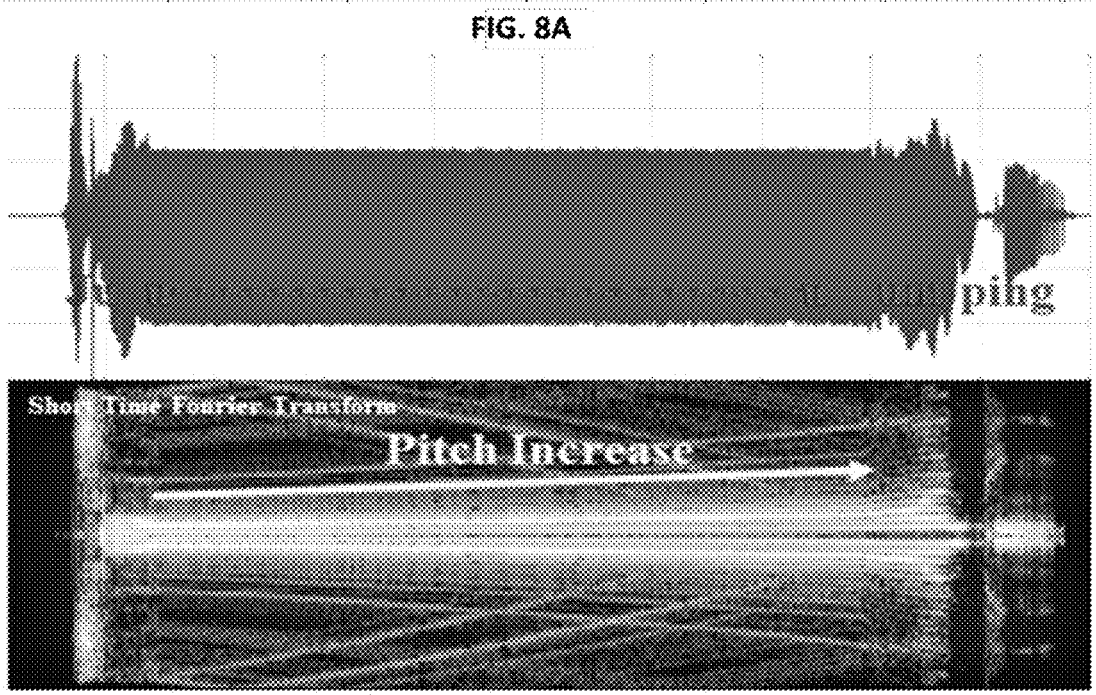

FIGS. 8A and 8B are graphs showing a string engine sound generated by the present disclosure.

Referring to FIG. 6, a waveform change of a vowel section may be seen when a person pronounces by increasing "u" of a "jumping" string.

When the string is stretched without changing the pitch, the vowel waveforms may be similar to each other in the flattening section as shown in FIG. 6. Therefore, it may be seen that the vowel section may be increased by repeating the waveform of one period.

Meanwhile, a parasitic period component may be included in the wavetable during a repeated reproduction process when the sound source stored in the table includes several periods with unequal envelope sizes. In comparison, as shown in FIG. 7, in the present disclosure the most stable period waveform may be extracted from a flattened vowel section and used as a repeating sound source in order to generate a soft string engine sound.

In addition, as shown in FIG. 8A, it may be seen that the probability that the sound source waveform represents the letter is calculated, and the waveform and the string may then be matched with each other. It may be seen that the repeating section is then selected by selecting a vowel "u" part, and as shown in the operation (b), the string engine sound is generated by increasing the pitch during the acceleration, modulating a remaining "um ping" based on the increased pitch, and outputting the same.

As set forth above, the engine sound generating system and the engine sound generating method, based on the string sound source, according to the various embodiments of the present disclosure, may deliver one meaning by recognizing the waveform of the vowel section and naturally increasing the same when compared to applying the string sound source to the general virtual engine sound generating system.

In addition, the sound generated by the active sound design (ASD) may largely include the engine sound and a cyber sound, and the new string sound classification may be added by using the present disclosure. As a result, more interesting engine sound may be designed, which enables activation of a user-participating service in an environment such as a metaverse. In particular, a string effect sound generating from a game or the like may be reproduced in the actual vehicle based on an activation condition, thus providing the driver with not only a new experience but also an improved pleasure of driving.

Although the embodiments of the present disclosure are described as above, the embodiments disclosed in the present disclosure are provided not to limit the spirit of the present disclosure, but to fully describe the present disclosure. Therefore, the spirit of the present disclosure may include not only each disclosed embodiment, but also a combination of the disclosed embodiments. Further, the scope of the present disclosure is not limited by these embodiments. In addition, it is apparent to those skilled in the art to which the present disclosure pertains that a variety of variations and modifications could be made without departing from the sprit and scope of the appended claims, and all such appropriate variations and modifications should be considered as falling within the scope of the present disclosure as equivalents.

What is claimed is:

1. An engine sound generating system based on a string sound source, positioned in a moving object, the system comprising:
   a repeating section selection unit configured to recognize a vowel section from an input sound source and to select a repeating section to be repeated based on the vowel section;
   a repetitive waveform generating unit configured to generate a repetitive waveform based on the selected repeating section; and
   an engine sound output unit configured to generate and output an engine sound by interpolating the repetitive waveform.

2. The system of claim 1, wherein:
   the repeating section selection unit includes a string recognition unit configured to recognize a string from the input sound source, and
   the string recognition unit is configured to calculate a probability that a waveform of the input sound source at a predetermined time point is to be classified into a predetermined letter.

3. The system of claim 2, wherein the string recognition unit is configured to extract a feature from the input sound source, to encode the extracted feature, and to classify the encoded feature into the predetermined letter and a word boundary.

4. The system of claim 3, wherein the string recognition unit is configured to:
   match the predetermined letter for each extracted feature, and recognize the string by merging identical consecutive letters with each other.

5. The system of claim 2, wherein the repeating section selection unit is configured to output a boundary of each letter in the waveform based on the string.

6. The system of claim 5, wherein the repeating section selection unit is configured to:
   recognize the vowel section by calculating a path having a maximum value among probabilities that the waveform at a specific time point maintains a current character or advances to a next character, and
   match the string and the waveform with each other.

7. The system of claim 1, wherein the repeating section selection unit is configured to:
   classify the vowel section for each period to calculate average signal power and a frequency response, and select a section, in which changes in the average signal power and the frequency response are minimized, as the selected repeating section.

8. The system of claim 1, wherein the repetitive waveform generating unit is configured to generate the repetitive waveform by interpolating a sample waveform having a period in units of real numbers.

9. The system of claim 1, wherein the engine sound output unit is configured to:
   generate the engine sound when at least one of (i) an output of an accelerator position sensor (APS) positioned in the moving object and (ii) revolutions per minute (RPM) of the moving object, is rapidly increased, and generate the engine sound by interpolating the repetitive waveform while increasing a pitch scale factor of the repetitive waveform as the at least one of the output of the APS and the RPM of the moving object is rapidly increased.

10. The system of claim 9, wherein the engine sound output unit is configured to modulate a last part of a predetermined length of the input sound source based on a pitch of the engine sound, and then to output the engine sound when it is determined that an acceleration is saturated based on either the output of the APS or RPM of the moving object.

11. An engine sound generating method based on a string sound source of an engine sound generating system which is positioned in a moving object, the engine sound generating unit including a repeating section selection unit, a repetitive waveform generating unit, and an engine sound output unit, the method comprising:
   (a) recognizing, by the repeating section selection unit, a vowel section from an input sound source, and selecting a repeating section to be repeated based on the recognized vowel section;
   (b) generating, by the repetitive waveform generating unit, a repetitive waveform based on the selected repeating section; and
   (c) generating and outputting, by the engine sound output unit, an engine sound by interpolating the repetitive waveform.

12. The method of claim 11, wherein recognizing the vowel section further includes:
   (a-1) recognizing a string from the input sound source;
   (a-2) outputting a boundary of each letter in the waveform based on the recognized string, and
   (a-3) using the recognized string from (a-1) for determining probability that a waveform of the input sound source at a predetermined time point is to be classified into a predetermined letter.

13. The method of claim 12, wherein, from (a-1), a feature is extracted from the input sound source, the extracted feature is encoded, and the encoded feature is classified into the predetermined letter and a word boundary.

14. The method of claim 13, wherein the predetermined letter is matched for each extracted feature, and the string is recognized by merging identical consecutive letters with each other.

15. The method of claim 12, wherein, from (a-2), the vowel section is recognized by calculating a path having a maximum value among probabilities that the waveform at a specific time point maintains a current character or advances to a next character, and matching the string and the waveform with each other.

16. The method of claim 15, wherein recognizing the vowel section (a-2) further includes:
classifying the recognized vowel section for each period to calculate average signal power and a frequency response, and selecting a section in which changes in the average signal power and the frequency response are minimized as the repeating section.

17. The method of claim 11, wherein the repetitive waveform is generated by interpolating a sample waveform having a period in units of real numbers.

18. The method of claim 11, wherein generating and outputting the engine sound further includes:
generating the engine sound when at least one of output of an accelerator position sensor (APS) positioned in the moving object or revolutions per minute (RPM) of the moving object is rapidly increased, and by interpolating the repetitive waveform while increasing a pitch scale factor of the repetitive waveform as the at least one of the output of the APS and the RPM of the moving object is rapidly increased.

19. The method of claim 18, wherein a last part of a predetermined length of the input sound source is modulated based on an increased pitch of the engine sound, and the engine sound is then output when it is determined that an acceleration is saturated based on either the output of the APS or the RPM of the moving object.

* * * * *